United States Patent [19]
James

[11] Patent Number: 5,109,277
[45] Date of Patent: Apr. 28, 1992

[54] SYSTEM FOR GENERATING TEMPERATURE IMAGES WITH CORRESPONDING ABSOLUTE TEMPERATURE VALUES

[75] Inventor: Richard K. James, Redmond, Wash.

[73] Assignee: Quadtek, Inc., Redmond, Wash.

[21] Appl. No.: 541,275

[22] Filed: Jun. 20, 1990

[51] Int. Cl.$^5$ .............................................. H04N 7/18
[52] U.S. Cl. ................... 358/100; 364/557; 374/141; 358/110
[58] Field of Search .............. 358/100, 110, 113, 107, 358/81; 356/43; 364/557, 477; 374/121, 124, 129, 141, 142, 167

[56] References Cited

U.S. PATENT DOCUMENTS

| | | | |
|---|---|---|---|
| 3,544,710 | 12/1970 | Poos | 178/6 |
| 4,217,608 | 8/1980 | MacGregor et al. | 358/113 |
| 4,365,307 | 12/1982 | Tatsuwaki et al. | 358/110 X |
| 4,403,251 | 9/1983 | Domarenok et al. | 358/107 |
| 4,463,437 | 7/1984 | Schenck et al. | 364/557 |
| 4,520,390 | 5/1985 | Paredes et al. | 358/108 |
| 4,539,588 | 9/1985 | Ariessohn et al. | 358/113 |
| 4,737,844 | 4/1988 | Kohola et al. | 358/100 |
| 4,794,452 | 12/1988 | Taft et al. | 358/100 |
| 4,814,868 | 3/1989 | James | 358/100 |
| 4,910,593 | 3/1990 | Weil | 358/113 |

Primary Examiner—Victor R. Kostak
Attorney, Agent, or Firm—Christensen, O'Connor, Johnson & Kindness

[57] ABSTRACT

A temperature-imaging system for generating an absolute temperature value for a point of interest on a monitored surface is disclosed. The system includes a camera and a temperature analyzer. The camera gathers video image data related to surface intensity and reference temperature data related to the absolute temperature at a reference point on the surface. The camera is configured so that the reference point is a fixed known point in the surface intensity image that moves with the movement of the camera. Thus, the reference temperature to reference point relationship is fixed. In operation, a video image and the reference temperature data are passed to the temperature analyzer. The temperature analyzer determines the absolute-temperature at a preselected point of interest on the surface. The temperature analyzer identifies the portion of the video image corresponding to the point of interest, and identifies the portion of the video image related to the reference point. The temperature analyzer generates an absolute temperature value for the point of interest by analyzing the reference temperature data, and the video image intensities related to the reference point and the point of interest. Because of the fixed relationship between the reference temperature data and the reference point in the video image, the system is always well calibrated and provides accurate absolute temperature outputs.

19 Claims, 6 Drawing Sheets

SYSTEM FOR GENERATING TEMPERATURE IMAGES WITH CORRESPONDING ABSOLUTE TEMPERATURE VALUES

TECHNICAL FIELD OF THE INVENTION

The present invention relates to imaging systems and, more particularly, to a temperature-imaging system for providing accurate absolute temperature information for an imaged surface.

BACKGROUND OF THE INVENTION

The operation of furnaces, kilns, chemical recovery boilers, etc., depends in part on the temperatures of the processes. Many of these processes take place at such high temperatures that direct visual observation of the process is impossible. Further, the accuracy of direct visual observation, particularly of temperature, is often inadequate for proper process control. Thus, a variety of remote high temperature-monitoring systems have been developed. A main focus of these high temperature-monitoring systems is to provide an indication of the relative or absolute temperature at various locations in the process area. The temperature measurements are then used in the process control system. For example, in a furnace control process, relative variations in the furnace surface temperature can be used as feedback for the control of the discharge and placement of additional fuel.

In prior temperature-monitoring systems, emphasis was placed on the relative temperatures, rather than the absolute temperatures, across the process area. This emphasis was dictated in part by limitations in the temperature-monitoring technology. Often, the temperature-monitoring systems include infrared cameras connected to imaging devices. A video image of the surface is gathered by the camera. The video image is then shaded or colored and displayed. The shading/coloring differences indicate relative temperature differences. Such shaded or colored images provide no absolute temperature information.

Temperature-monitoring systems have been developed to provide limited absolute temperature measurements in applications that require such information. These systems are generally limited in the amount and accuracy of absolute temperature information that is generated by the system.

One such temperature-monitoring system provides absolute temperature verification for an area of a furnace. The monitoring system includes an infrared camera, a thermocouple or temperature sensor, and an imaging device. The thermocouple is positioned in the furnace in the line of sight of the camera. The position of the thermocouple relative to the furnace surface is referred to as the reference point. In operation, the image gathered by the infrared camera is converted into a colorized video image via a false color display. The video image data is also converted into temperature data using a standard conversion algorithm. The temperature data generated from the video image data must be validated to avoid errors due to improper calibration of the infrared camera. To validate the converted temperature data, the thermocouple temperature reading is compared to the converted temperature data for the reference point. If the converted temperature value is within an acceptable range relative to the thermocouple temperature reading, then the entire set of converted temperature data is accepted; otherwise, the converted temperature data is rejected.

One of the major disadvantages of such a temperature-monitoring system is that the thermocouple and the camera must be accurately aligned, i.e., the reference point must be identifiable in the video image data. If the devices are not properly aligned, the converted temperature data for the reference point may have a low correspondence with the thermocouple measurement and the converted temperature data will be repeatedly rejected. Additionally, if the devices are not properly aligned and the converted temperature value happens to fall in the acceptable range, the entire converted data set will still be accepted. Finally, since a calibration "range" is utilized, the system will be subject to inaccurate temperature readings.

The present invention overcomes these and other problems in the prior art.

SUMMARY OF THE INVENTION

The method and apparatus of the present invention provides continuous, on-line imaging of surface temperatures. The system generates an absolute temperature value for a point of interest on a surface. The temperature for the point of interest is determined using a relationship between the radiant intensity measured at the point of interest, and the radiant intensity and absolute temperature measured at a reference point. The relationship between the reference point and the measured reference temperature is predetermined. This relationship is used to calibrate the point of interest temperature calculations. The system provides well-calibrated temperature readings.

The temperature-imaging system includes a camera and a temperature analyzer. The camera gathers surface image data related to surface temperature and gathers reference temperature data related to the absolute temperature at a reference point on the surface. The relationship between the surface temperature image and the reference point at which the reference temperature data is measured is preestablished. Generally, the camera gathers an emitted image of the surface. The camera generates surface image data and reference temperature data from the emitted image. The surface image data and the reference temperature data are passed to the temperature analyzer. The temperature analyzer determines the absolute temperature at a preselected point of interest on the surface. The temperature analyzer identifies surface image data related to the point of interest and surface image data related to the reference point. The temperature analyzer generates an absolute temperature value for the point of interest by combining the reference temperature data, the reference point surface image data, and the point of interest surface image data. The present system provides a highly accurate correlation between the reference temperature data and the reference point surface image data and therefore provides a highly accurate temperature calibration for the point of interest temperature analysis.

In accordance with additional aspects of the present invention, the camera includes a video imager, a pyrometer, and a beam splitter. The beam splitter directs a portion of the emitted image to the video imager and a portion of the emitted image to the pyrometer. The video imager may be a vidicon tube or a solid state detector.

In accordance with other aspects of the present invention, the positional relationship between the reference point and the reference temperature data is established prior to generating an absolute temperature for a point of interest. The relationship is established by identifying a reference point on the surface, adjusting the pyrometer position relative to the beam splitter such that the same portion of the emitted image that is directed to the video imager and that results in the reference point surface image data is input to the pyrometer. The position of the pyrometer is then fixed within the camera. The position of the reference point is stored for use in the temperature analysis. In this manner, the reference temperature is always measured at an identifiable point relative to the surface image data. Thus, the camera may be repositioned and the reference point will not require recalibration.

In accordance with other aspects of the present invention, the absolute temperature value T is determined by:

$$T = \frac{\theta}{\frac{\theta}{T_R} - \gamma \ln\left[\frac{(V_M - V_B)}{(V_R - V_B)}\right]},$$

where $V_B$ is a black level signal input, $T_R$ is the reference temperature value, $V_R$ is the reference data, $V_M$ is the first data, $\theta$ is approximately $14384\mu°$ K., and $\gamma$ is a power coefficient.

In accordance with still other aspects of the present invention, the system also includes an operator interface device in communication with the temperature analyzer. The interface device displays the surface intensity image and the temperature values. The interface device includes an operator controlled cursor, the position of which corresponds to the point of interest.

In accordance with still further aspects of the present invention, the system determines the absolute temperature for a region of interest. The temperature analyzer identifies a portion of the surface image data related to the region of interest and a portion of the surface image data related to the reference region. The intensities of the image data portions are averaged to produce a region of interest average and a reference region average. This information is combined with the reference temperature data to determine an absolute temperature for the region of interest.

BRIEF DESCRIPTION OF THE DRAWINGS

The foregoing abstracts and the attendant advantages of this invention will become more readily appreciated and the same become better understood by reference to the following detailed description, when taken in conjunction with the accompanying drawings, wherein.

DETAILED DESCRIPTION OF THE PREFERRED EMBODIMENT

The present invention is useful for temperature imaging of processes carried out in furnaces, kilns, etc., or in other temperature-sensitive applications. For ease of description, the application of the invention in a furnace temperature-monitoring system will be described herein. However, it is to be understood that the system of the present invention is also applicable to other environments.

Figure 1:
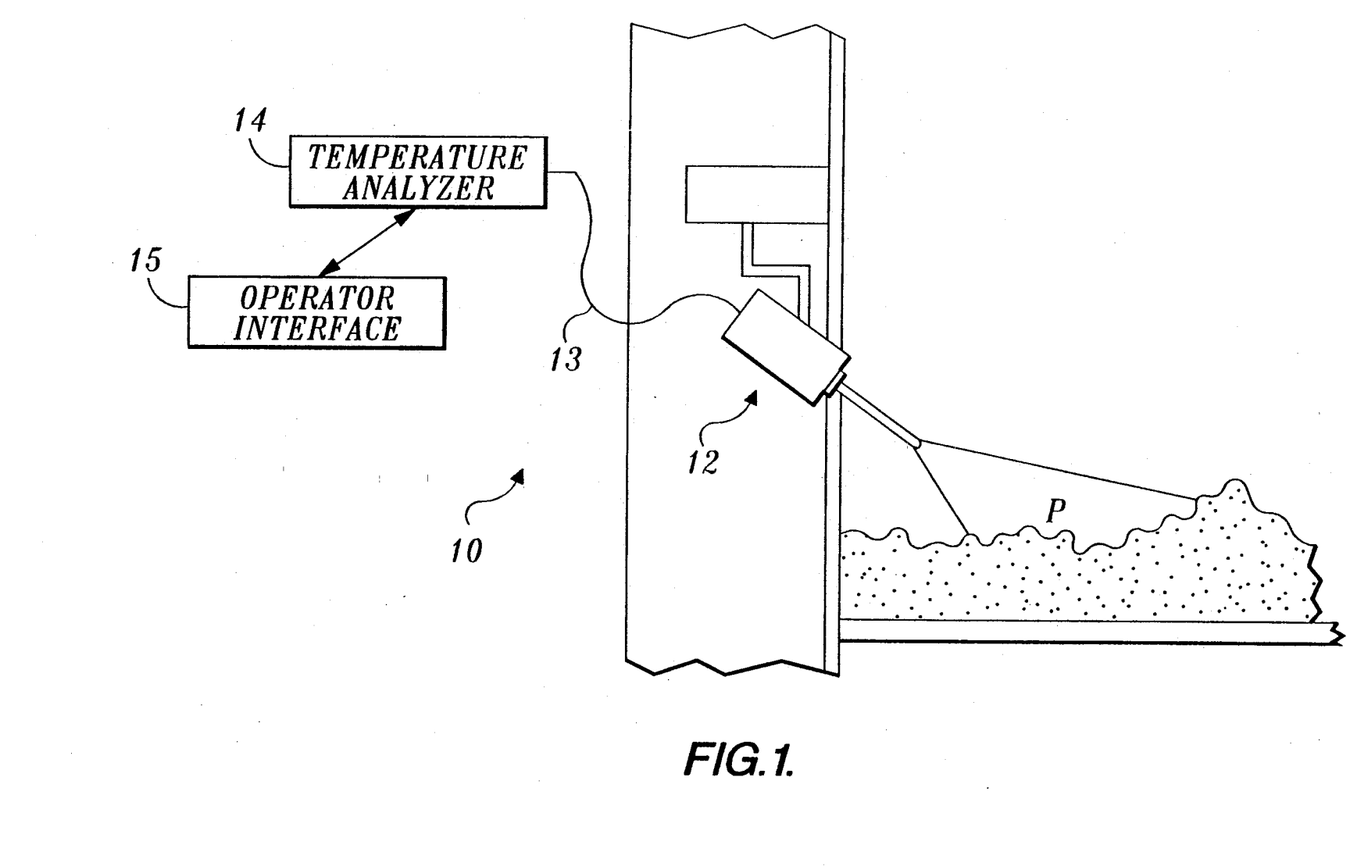
FIG. 1 is a pictorial diagram of a temperature-imaging system in a furnace application in accordance with the present invention.

With reference to FIG. 1, the temperature-imaging system 10 includes a camera 12 connected via cable 13 to a temperature analyzer 14. An optional operator interface 15 is connected to the temperature analyzer 14. The camera 12 gathers a video image of the process conditions P, e.g., the surface of the bed in a smelt furnace, and gathers reference temperature data. The video image is an image of the temperature emissions from the bed surface. The reference temperature data includes absolute temperature information corresponding to a predetermined reference region on the bed surface. The combined video image and reference temperature data is transferred to the temperature analyzer 14.

The temperature analyzer 14 receives the data and separates the video image from the reference temperature data. The video image is converted into a digital image comprised of a two-dimensional array of pixels (picture elements). Each of the pixels represents a point (or region) on the bed surface. The video intensity of each pixel corresponds to a relative temperature at a position on the furnace surface. In order to calibrate the temperature readings, the reference temperature value is related to the reference region of the image, which is the region of the digital image corresponding to the reference region of the bed surface. This region is predetermined by the camera configuration as discussed below. The video intensity at the reference region is determined from the digital image. Using a temperature-to-intensity relationship established with the reference temperature and the reference region intensity, an absolute temperature value can be determined for any other identified point or region in the video image. Thus, the system provides real-time monitoring of absolute temperatures combined with continuous system calibration. The result is an accurate set of absolute temperature values for the bed surface.

Figure 2:
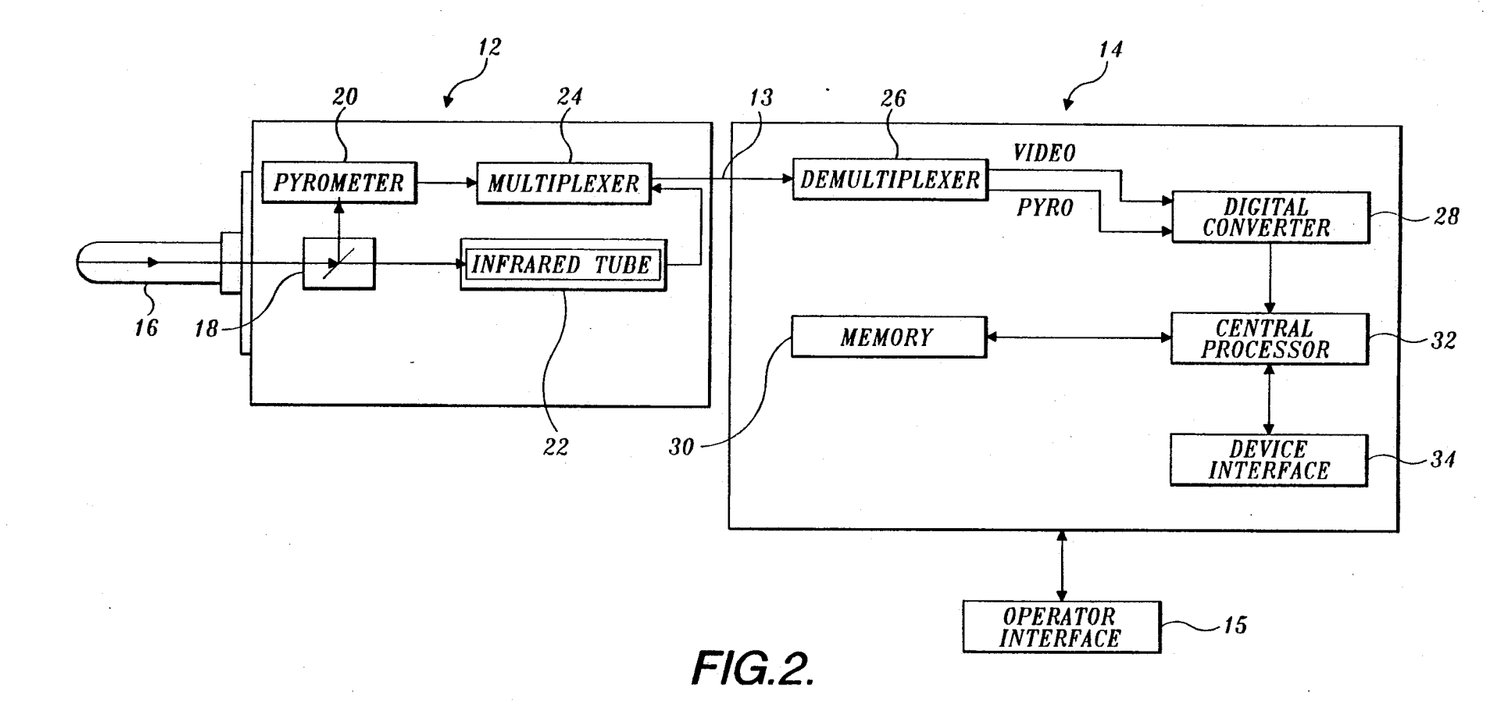
FIG. 2 is a block diagram of a temperature imaging system in accordance with the present invention.

With reference to FIG. 2, the camera 12 includes a lens tube 16, a beamsplitter 18, a pyrometer 20, a video imager 22, and a signal multiplexer 24. Preferably, the lens 16 is a special high-temperature lens. The end of the lens tube 16 is positioned in or adjacent the furnace. The lens tube contains objective, collecting, and collimating lenses (not shown) that are well known for transmitting an image to a camera. The beam splitter is a mirror that reflects part of the beam of light from the lenses to the pyrometer and transmits part of the beam to the video imager.

The pyrometer 20 is a well-known device for converting intensity information into temperature information. The pyrometer uses a square-shaped sensor that provides an average temperature value for the region that it observes. Preferably, the pyrometer is capable of accurately measuring temperatures from 1160° F. (600° C.) to 2600° F. (1430° C.). The video imager 22 is a well-known camera device for generating an intensity image, i.e., an image of radiant energy. Examples of video imagers are a COHU 5000 Series camera including an infrared vidicon tube, available from COHU, Inc., of San Diego, Calif., and a Javelin JE2362A solid state camera including a solid state detector, available from Javelin Electronics of Torrence, Calif. In one actual embodiment, the camera 12 is a BEDBUG ® II M330 high-temperature infrared camera, available from the assignor of this application.

In operation, an image of the bed surface is transmitted by the camera lens tube to the beam splitter 18. The beamsplitter transmits a portion of the surface image to the video imager 22 and reflects a portion of the surface image to the pyrometer 20. In this manner, the pyrometer shares the same optical path as the video imager. By securing the position of the pyrometer relative to the input from the beam splitter, the reference region over which the pyrometer temperature measurement is taken is identifiable in the resultant video image. The video imager outputs the video image; the pyrometer outputs reference temperature data. The multiplexer combines the video image and temperature data into a single set of video signals. The video signals are transmitted over line 13.

Before the system is used, the position of the pyrometer relative the input from the beam splitter is fixed. One actual positioning method includes positioning a blackbody device on a surface that is imaged by the camera. The blackbody device outputs radiation of a known level corresponding to a given temperature. The camera generates a video image of the surface radiation intensity which is digitized and displayed on a monitor. The region at which the blackbody is located is apparent in the displayed video image since the blackbody temperature contrasts with the remainder of the surface. This region is referred to as the reference region and is identified on the monitor with a reference cursor. The reference cursor x-y position corresponds to the x-y position of the reference region in the video image.

The pyrometer temperature output is then considered. The pyrometer output is low when the pyrometer is focused on an area of the surface that does not contain the blackbody device. When the pyrometer is focused on the area of the surface containing the blackbody device, the temperature output is high. In order to establish the pyrometer position, the pyrometer position relative to the input beam from the beam splitter is altered until the temperature output is at its highest. At this position, the pyrometer sensor is focused on the position of the surface corresponding to the region identified by the reference cursor position on the resultant video image. The physical position of the pyrometer within the camera is fixed and the position of the reference cursor is stored.

Using this method, the alignment of the pyrometer reading with respect to the reference region is established. The camera can be repositioned without disturbing the pyrometer and reference region relationship. This system provides an advantage over prior systems that require the pyrometer position to be calibrated each time a system is set up in a furnace. The present system also provides for a highly accurate calibration. Further, if pyrometer repositioning is necessary, it is a straightforward task.

In conjunction with the camera, the temperature-imaging system requires a component for analyzing the video signals to determine the absolute temperature for an area other than the reference region. The temperature analyzer 14 provides this capability. The temperature analyzer 14 includes a signal demultiplexer 26, digital converter 28, a memory component 30, a central processor 32, and a device interface 34. In general operation, the temperature analyzer receives the video signals from the camera 12. The video image is separated from the reference temperature data by the demultiplexer 26. The demultiplexed signals are passed to the digital converter 28, which digitizes the signals. The results of the digitization are a digital image and a reference temperature value. The central processor 32 receives the digital image data and the reference temperature. In order to determine the absolute temperature value at a region of interest, a temperature-to-intensity relationship is applied to the reference temperature, the average intensity of the reference region, and the average intensity of the region of interest. The result is the absolute temperature value for the region of interest. The digital image and the temperature values are displayed via operator interface 15.

The temperature analyzer 14 identifies a portion of the digital image corresponding to the reference region using the preestablished x-y position of the reference cursor. The temperature analyzer uses the region of interest cursor x-y position to identify the region of interest in the digital image for which an absolute temperature value is to be generated. The region of interest cursor position can be preset or may be identified in real-time by an operator. The temperature analyzer can calculate an absolute temperature for any point on the digital image that is selected as the region of interest.

Figure 3:
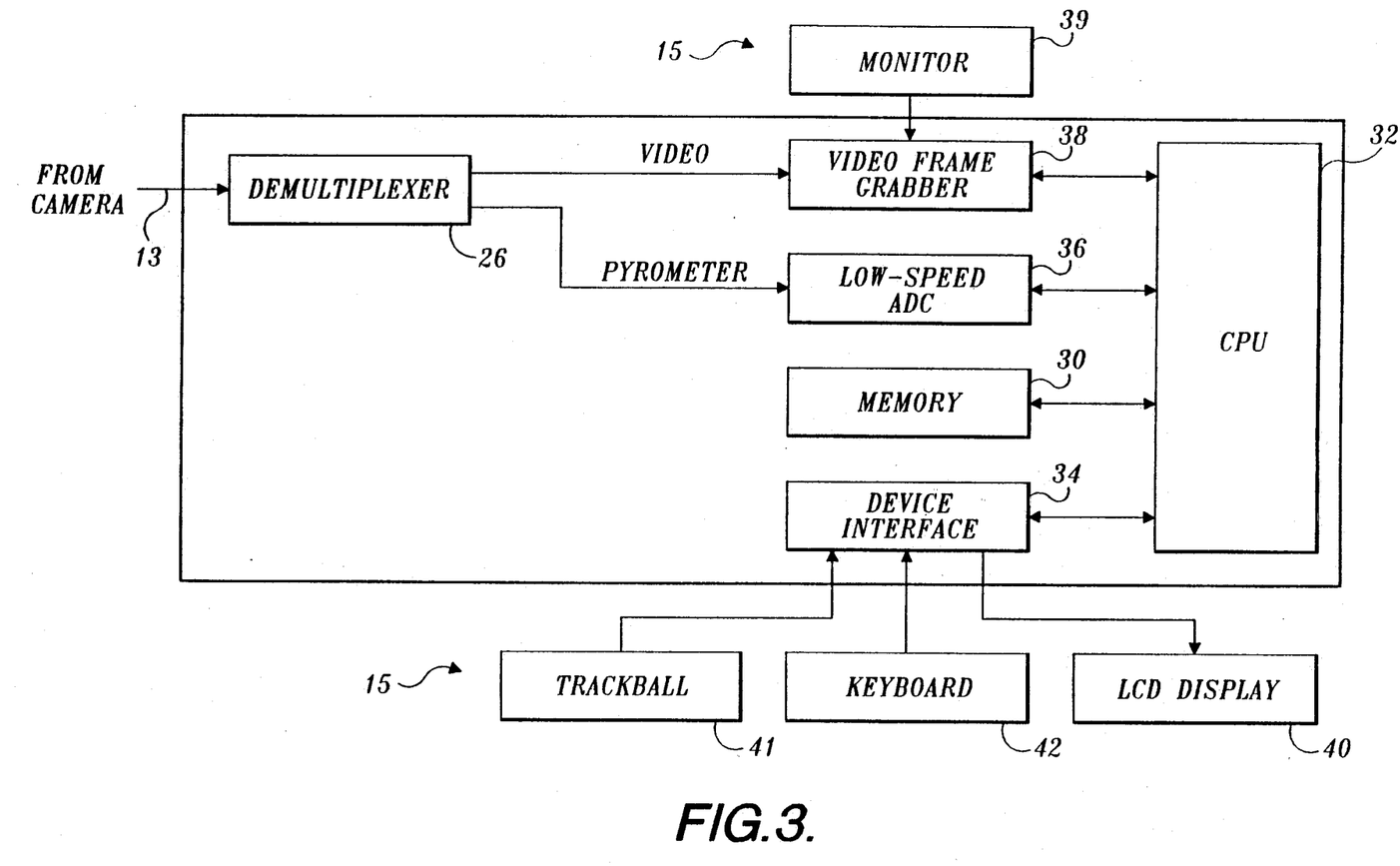
FIG. 3 is a detailed block diagram of a temperature analyzer in accordance with the present invention.

In one actual embodiment, the temperature analyzer 14 is a special purpose microprocessor. With reference to FIG. 3, the special purpose microprocessor includes the central processor 32, the memory component 30 and a device interface 34. The signal demultiplexer 26 is a separate integrated circuit board. The digital converter includes a standard low-speed analog-to-digital converter (ADC) 36 and a video frame grabber 38. The ADC digitizes the temperature information and the video frame grabber digitizes the image signals. In one actual embodiment, the video frame grabber is a Model 2853, available from Data Translation of Massachusetts. The video frame grabber controls the process of receiving image signals from the camera and generating a video display. Thus, in this particular embodiment, the video frame grabber performs certain interface functions separately from device interface 34.

In one actual embodiment, the operator interface 15 includes a monitor 39, a liquid crystal diode (LCD) display 40, a trackball 41 and a keyboard 42. The monitor 39 is connected to the video frame grabber and is used for display of the digital image. The LCD display 40, trackball 41 and keyboard 42 are connected to the device interface 34. The operator can input commands and cursor control information via the keyboard and trackball. Temperature data is displayed via the LCD display.

Figure 4:
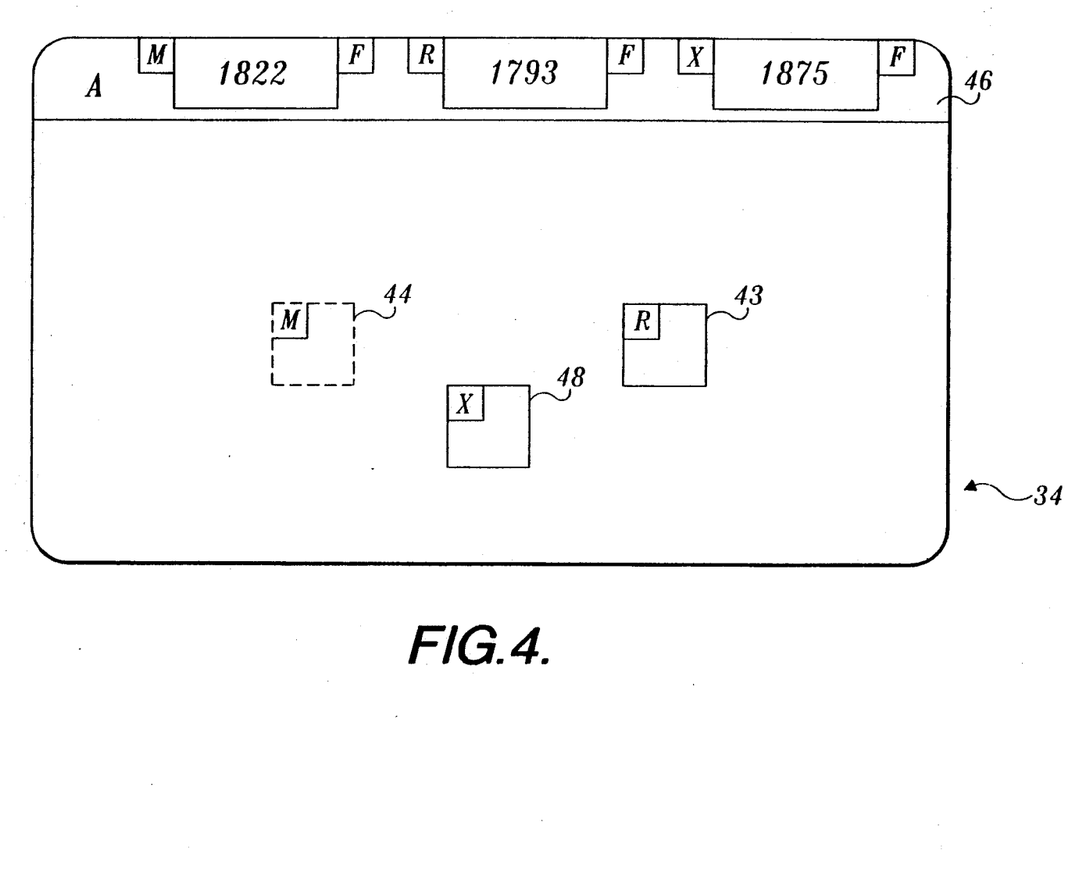
FIG. 4 is a schematic diagram of a temperature image displat in accordance with the present invention.

With reference to FIG. 4, in one actual embodiment, the digital image generated by the video frame grabber is displayed on the monitor 39 and two cursors, reference cursor 43 and movable cursor 44, are overlaid on the image. The absolute temperatures at the regions identified by the cursors are displayed on an information strip 46 across the top of the display.

The reference cursor 43 identifies the region at which the pyrometer temperature measurement is taken. The position of the reference cursor is predetermined by the positioning of the pyrometer relative to the input beam.

As described above, this position is fixed and is referred to as the reference region. The position of the reference region relative to the entire image is stored in the memory and used by the video frame grabber to display the cursor. The movable cursor 44 may be moved to any position on the digital image via operator input control using the joystick or keyboard. The movable cursor identifies a region of interest for which an absolute temperature value is to be calculated. Using standard cursor control methods, the position of the movable cursor relative to the digital image can be determined. For example, the x-y position of the cursor on the screen identifies, or can be transformed into, the x-y position of the region of interest in the digital image. Additionally, a quasi-stationary cursor 48 can be positioned by an operator for long-term data gathering. Absolute temperatures are determined for the region of interest identified by the quasi-stationary cursor 48. All of the temperature values are displayed and/or recorded. Thus, the process is monitored in real-time and the data can also be recorded for later analysis of temperature trends.

The image-gathering and temperature analysis processes are continuous. Thus, the temperature readings are continuously being updated according to the current temperature-to-intensity relationship, which is established using a current reference temperature value. This aspect of the monitoring system provides the benefit of continuously calibrated and, therefore, highly accurate information that is not available in systems in which temperature calibration occurs at relatively infrequent time intervals or in an inaccurate fashion.

Figure 5:
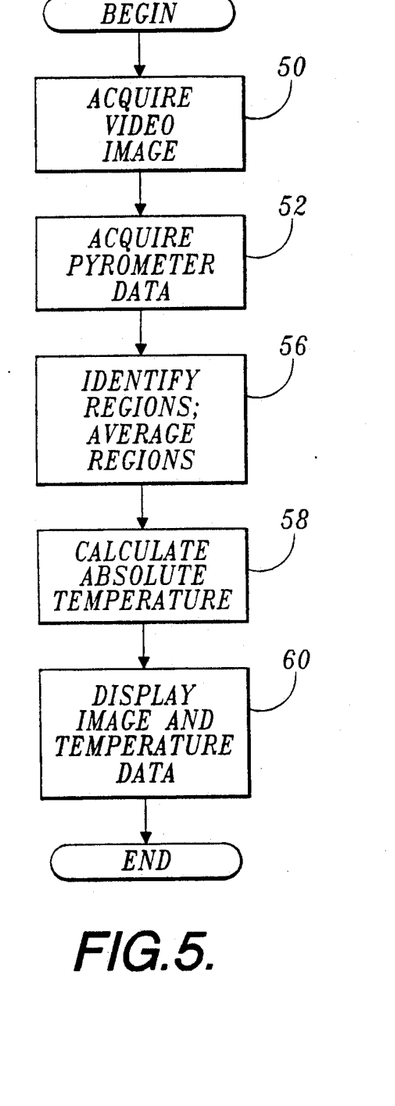
FIG. 5 is a flow diagram of a temperature-imaging process in accordance with the present invention.

Basic image-gathering and temperature analysis processes are described in conjunction with FIG. 5. At block 50, a digital video image is acquired; the acquisition includes obtaining the video image from the camera and digitizing the image. At block 52, pyrometer data is acquired; the acquisition includes obtaining the temperature data from the camera and digitizing it. At block 56, the reference region and the region of interest in the digital image are identified from the preestablished reference region information and the movable cursor position, respectively. The intensity at each region is averaged. At block 58, the absolute temperature at the region of interest is calculated. At block 60, the digital image and temperature data are displayed.

As illustrated in FIG. 5, two main operations are required for temperature monitoring: the video image and temperature data are gathered (blocks 50–54), and the information is analyzed to provide absolute temperature information (blocks 56–58). The data-gathering process includes the steps of obtaining the video image and temperature data from the camera and digitizing that information. These steps are performed under the control of the video frame grabber. The analysis process operates against the digitized information to generate absolute temperature information. These steps are controlled by a main program that is stored in memory 30 and executed by the central processor 32.

In one actual embodiment, the main program includes a video-gathering module and an analysis module. The two programs interact in an interrupt fashion wherein the analysis module is a main loop that is interrupted periodically so that the video-gathering module can execute. This configuration is preferable because the steps that are carried out under the control of the video-gathering module are faster than the steps carried out under the control of the analysis module. The main bottleneck in the process is caused by the limited data transfer capability between the video frame grabber and the central processor. Thus, rather than delaying all processes while the necessary digital image data is transferred, the analysis module executes independently of the video-gathering process. The analysis module is periodically interrupted and the video-gathering module is executed; the interrupt is essentially a signal that a portion of the digital image is available for transfer to the memory 30 for processing.

The video image and reference temperature data are gathered under the control of the video frame grabber. The digital image data is moved in blocks to the central processor memory. Only those portions of the digital image data that are to be analyzed are transferred. To identify that data, the video-gathering module selects the portions of the digital image data that are identified with the reference region and the region of interest. In this particular embodiment, approximately eight reads from the video frame grabber memory are required to obtain the data for both regions for the temperature analysis. Thus, approximately eight interrupt cycles occur before the temperature calculations are performed. In order to perform the temperature calculations, the average video intensity of the digital image for each region is calculated. The average video intensities and the reference temperature are analyzed to produce an absolute temperature value for the region of interest. Using this method, the absolute temperatures at any region of interest can be determined after the average video intensity for that particular region is calculated.

Figure 6:
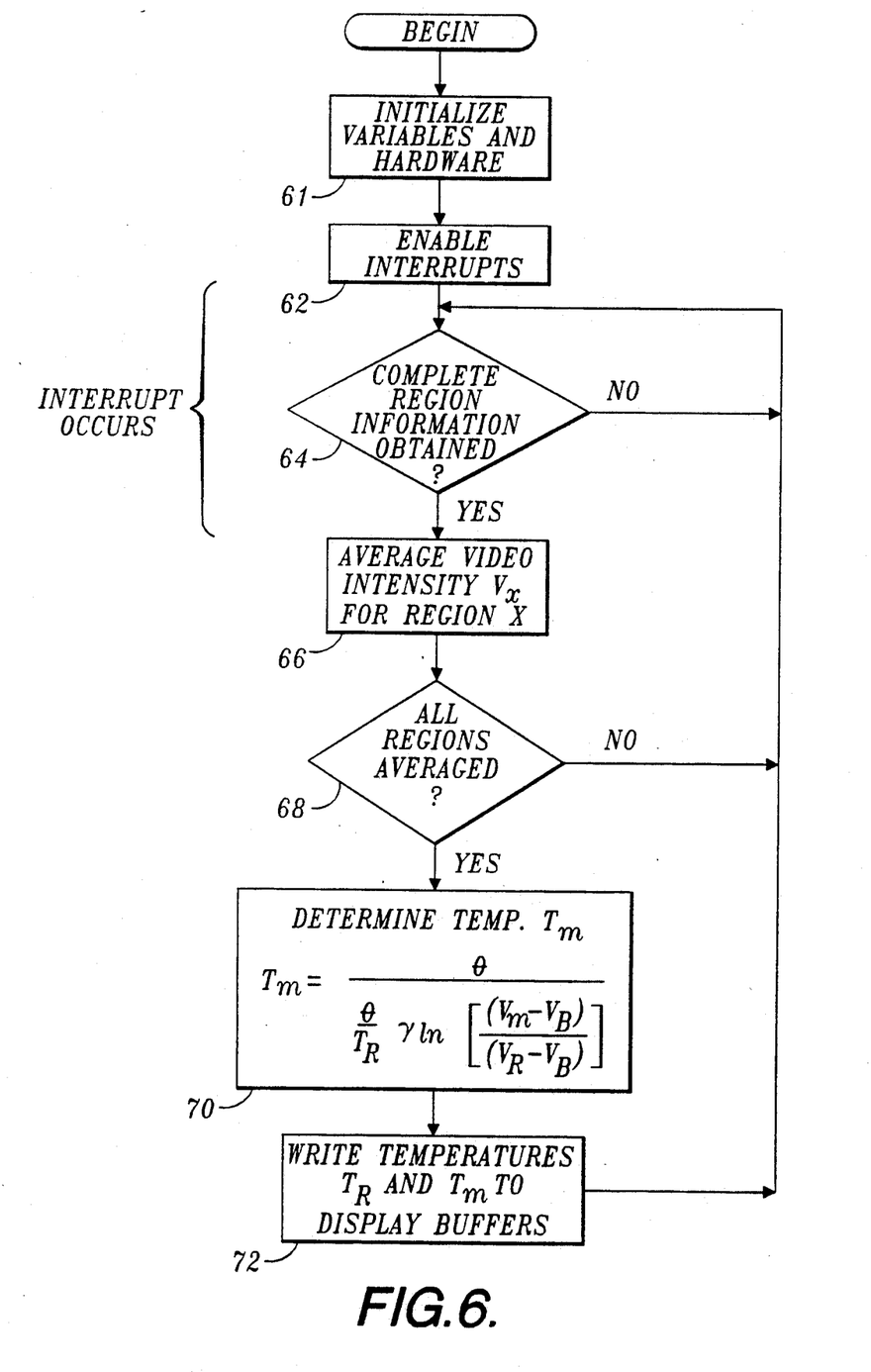
FIGS. 6 and 7 are detailed flow diagrams of one method of temperature imaging in accordance with the present invention.
Figure 7:
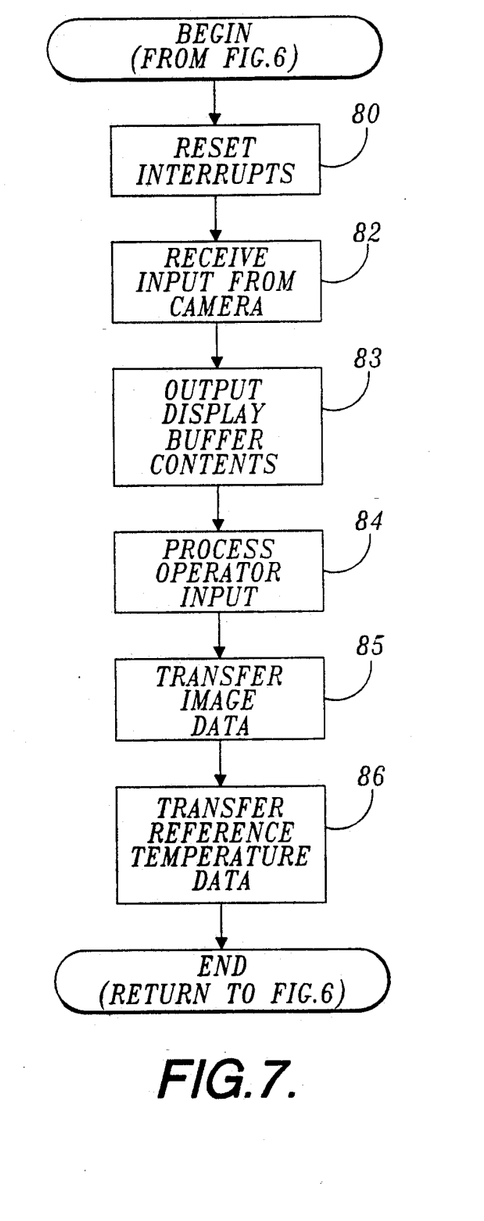

With reference to FIGS. 6 and 7, the flow of the process under the control of the analysis module and the video-gathering module, respectively, are shown. In the analysis module, at block 61, program variable and hardware initialization are performed. The video frame grabber is initialized for interrupt-driven video image acquisition. At block 62, the interrupt section of the central processor is enabled to respond to the video interrupts, and to call the video gathering module when an interrupt is received.

The analysis module enters its main loop at block 64. At this block, a check is made to determine whether the digital image data for the reference region or region of interest have been obtained. If the complete digital image data for one of the regions has not been obtained, then the process continues to loop at block 64. Periodically, an interrupt is generated by the central processor so that additional digital image data is transferred to the central processor memory. In one actual embodiment, the interrupts occur thirty times per second.

With reference to FIG. 7, when an interrupt occurs, the video interrupts are reset at block 80. At block 82, input is received from the camera. Generally, a full frame of video image data and the reference temperature data are received from the camera. The signals are demultiplexed as they are received by the temperature analyzer. The video signal is transmitted to the video frame grabber and the pyrometer signal is transmitted to the low-speed ADC. At block 83, temperature data from the display buffers of the video frame grabber (discussed below) are sent to the monitor 39 by the video frame grabber. At block 84, input from the operator interface is processed. For example, if the input requires some action to be taken, e.g., movement of a cursor, the action is processed by the video-gathering module.

At block 85, a portion of the digital image data is transferred from the video frame grabber memory to the central processor memory. The portion of the data that is transferred is data identified by the video-gathering module as either reference region or region of interest digital image data. In one actual embodiment, a 512×480 pixel image is gathered; a 50×40 pixel image is analyzed for each region. The regions are generally centered on the cursor positions. At block 86, the reference temperature data is transferred from the low-speed ADC and stored in the central processor memory for use in the temperature calculations.

With reference again to FIG. 6, at block 66, when complete digital image data for the reference region or for the region of interest has been obtained, video averaging is performed. As noted above, the pyrometer generates a temperature that is an average temperature for a region; the region over which the temperature is observed is generally larger than the region identified by a single point or pixel on a display screen. Thus, when the temperature analysis is performed, the analysis is performed against the average video intensity for a pixel region rather than against the video intensity for a single point (pixel) of the image. The use of averaging also reduces the effect of noise and picture fluctuations on the reference temperature. In the present example, a 50×40 pixel region is averaged.

At block 66, the average video intensity for a region is determined using standard averaging techniques. At block 68, a check is made to determine whether the digital image data for both the reference region and the region of interest have been averaged. If both of the regions have not been averaged, the process continues to loop at block 64. The resultant averages are the reference video average $V_R$ and the region of interest video average $V_M$.

At block 68, if both regions have been averaged, then the temperature calculation is performed at block 70. Generally, a temperature-to-intensity relationship is applied to the reference temperature $T_R$, the video average for the reference region $V_R$, and video average for the region of interest $V_M$ to determine the temperature $T_M$ at the movable cursor position. The equation is:

$$T = \frac{\theta}{\frac{\theta}{T_R} - \gamma \ln\left[\frac{(V_M - V_B)}{(V_R - V_B)}\right]} \quad (1)$$

where $V_B$ is the black level signal input, i.e., the zero light value that is commonly calibrated for video signals, $\theta$ is approximately 8990° K., and $\gamma$ is the power coefficient. The typical range for V is 0-255. The power coefficient $\gamma$ is typically 1.6 for vidicons and 1.0 for solid state detectors. The solution to the right-hand side of Equation (1) is a value for temperature T, which is the absolute temperature $T_M$ at the region of interest. At block 72, the values of the temperatures $T_R$ and $T_M$ are written into the display buffers of the video frame grabber. The temperatures are output to the screen by the video-gathering module during the next interrupt at block 82. The process returns to block 64 to resume video image data gathering. The process is continuous; it may be terminated at any point by an operator input.

By using Equation (1), once the digital image intensities for the reference region and for a region of interest are averaged, the absolute temperature at the region of interest can be accurately calculated. The region of interest can be interactively identified via the movable cursor. Alternatively, the region of interest can be preselected before the monitoring process begins. Clearly, any number of regions of interest can be identified and the absolute temperature for the region determined by the process described in conjunction with blocks 64-72. For example, a temperature for the region identified by the quasi-stationary cursor can be calculated. The digital image intensity for the quasi-stationary cursor region would be averaged at block 66. Equation (1) would be applied to this video average in conjunction with the reference temperature value and reference video average. The temperature for this region of interest would be calculated and output to the display buffer.

One advantage of the present invention is that Equation (1) is applied to the current value of the reference temperature that was obtained during the previous interrupt cycle. Thus, the reference temperature is constantly being calibrated rather than undergoing only periodic calibration. For this reason, and the reason that the reference region is fixed, the resultant temperature data is highly accurate.

The derivation of Equation (1) follows. This derivation is not necessarily carried out each time the equation is used since the equation can be directly applied to the reference temperature value and the video average values that are determined from the digital image data. The derivation is presented here for a better understanding of the invention. Based on normal vidicon behavior, the intensity response curve I for the video imager is defined as:

$$I = G(V - V_B)^\gamma, \quad (2)$$

where G is a constant gain calibration coefficient, V is the digitized input video level, which is the raw signal that is sent from the camera to the analog-to-digital converter, $V_B$ is the black level signal input, i.e., the zero light value that is commonly calibrated for video signals, and $\gamma$ is the power coefficient relating a video signal V and the intensity I. The typical range for V is 0-255. The power coefficient $\gamma$ is typically 1.6 for vidicons and 1.0 for solid state detectors.

A relationship between intensity I and temperature T is established using Planck's radiation function:

$$I = \frac{C_1 \lambda^{-5}}{e^{C_2/\lambda T} - 1}, \quad (3)$$

where $\lambda$ is wavelength, and $C_1$ and $C_2$ are fundamental constants:

$C_1 = 3.7403 \cdot 10^{10}$ microwatts $\mu^4/cm^2$; and $C_2 = 14384 \cdot \mu °K.$, wherein $\mu$ is microns, a unit of wavelength. The Wien approximation is applied to Equation (3) to produce:

$$I = \frac{C_1 \lambda^{-5}}{e^{C_2/\lambda T}} \quad (4)$$

Since the wavelength $\lambda$ is fixed in the system, intensity I is expressed as:

$$I = F e^{-C_2/\lambda T}, \quad (5)$$

where F is a constant proportionality factor. Equation (5) can be rewritten as:

$$I = Fe^{-\theta/T}, \quad (6)$$

where $\theta = C_2/\lambda$. In one actual embodiment, the wavelength $\lambda = 1.6\mu$ and $\theta = 8990°K$. Both Equations (2) and (6) describe intensity I.

The temperature $T_M$ for the region of interest is calculated. The region is identified using known cursor control methods as described above; the movable cursor position on the monitor is transformed into a digital image region identification. Because an independent pyrometer is used, a temperature-to-intensity relationship is established from the pyrometer (reference) temperature measurement and the intensity $I_R$ at the reference region. The reference region of the digital image is identified from the preestablished reference region information. The intensity $I_R$ is described by Equations (2) and (6) as:

$$I_R = G(V_R - V_B)^\gamma, \text{ and} \quad (7)$$

$$I_R = Fe^{-\theta/T_R} \quad (8)$$

Given the calibration relationship $V = V_R$ and $T = T_R$, Equations (2) and (7), and Equations (6) and (8) can be combined as:

$$I/I_R = \frac{(V - V_B)^\gamma}{(V_R - V_B)^\gamma} \quad (9)$$

and $$I/I_R = \frac{e^{-\theta/T}}{e^{-\theta/T_R}} = e^{\theta(\frac{1}{T_R} - \frac{1}{T})} \quad (10)$$

The combination of Equations (9) and (10) produces:

$$e^{\theta(\frac{1}{T_R} - \frac{1}{T})} = \frac{(V - V_B)^\gamma}{(V_R - V_B)^\gamma} \quad (11)$$

Solving Equation (11) for temperature T:

$$T = \frac{\theta}{\frac{\theta}{T_R} - \gamma \ln\left[\frac{(V - V_B)}{(V_R - V_B)}\right]} \quad (1)$$

The video average $V_M$ for the region of interest is substituted for V in Equation (1); all other known values are substituted into Equation (1). The result is temperature T, denoted $T_m$, for the region of interest.

While preferred embodiments of the invention have been illustrated and described, it will be appreciated that various changes can be made therein without departing from the spirit and scope of the invention. For example, in one actual embodiment, the digitized image is colorized by the video frame grabber so that a color display is provided. The various colors of the display represent absolute temperature ranges across the image. In such a case, a color-to-intensity range reference guide is included in the display information strip.

The system parameters can be updated as a part of the analysis module main loop that begins at block 64. The system parameters include screen color palette, temperature units, etc. If the color palette has changed, the new colors are sent to the video buffers during the video interrupt process.

Although the preferred embodiment includes a video frame grabber device, the invention can be carried out on a system including discrete video gathering and video display generating components that perform the timing and control functions commonly provided by the video frame grabber.

Another modification to the described embodiment is to omit the step of video averaging that is generally performed before the absolute temperature value is calculated. For the region of interest and the reference region, the intensity for a single pixel value is used in Equation (1). Alternatively, the region over which the video averaging occurs can be modified depending upon the accuracy of the video-imaging components, the system speed requirements, etc. Suggested regions for a 518×480 image are between 10 and 100 square pixels.

Finally, the multiplexer and demultiplexers are used in a particular actual embodiment of the invention. Clearly, the video and temperature signals can be transferred between the camera and the temperature analyzer without being combined. The use of the multiplexer and demultiplexer components simplifies the hardware requirements of the system.

Using the present invention, the operator can view and accurately measure the temperature of any region of the bed surface, compare the overall temperature distribution, and gather useful temperature trending data for comparison against other process parameters.

The embodiment of the invention in which an exclusive property or privilege is claimed are defined as follows:

1. A temperature-imaging system for generating an absolute temperature value for a point of interest on a surface, the system including:
   (a) camera means for gathering surface image data and reference temperature data, said camera means including:
      (i) image-gathering means for gathering an emitted image of the surface;
      (ii) video imager means for generating surface image data from said emitted image; and
      (iii) temperature-generating means for generating reference temperature data from said emitted image for a predetermined reference point on the surface, wherein the positional relationship between said reference point and said surface image data is fixed; and
   (b) temperature-analyzing means for determining the absolute temperature at a point of interest on the surface;
      (i) communication means for receiving said surface image data and said reference temperature data from said camera means;
      (ii) region identifying means for identifying surface image data related to said point of interest and for identifying surface image data related to said reference point; and
      (iii) analysis means for generating an absolute temperature value related to said point of interest by combining said reference temperature data, said reference surface image data, and said point of interest surface image data, such that said combination is said absolute temperature value.

2. A system as claimed in claim 1, wherein said temperature-generating means includes a pyrometer, and said camera means further includes a beam splitter for directing a portion of said emitted image to said video imager means and a portion of said emitted image to said pyrometer, wherein the position of said pyrometer is fixed within said camera means such that the portion of said emitted image that is directed to said video imager means and results in said reference point surface image data is also directed into said pyrometer.

3. A system as claimed in claim 2, wherein said positional relationship between said reference point and said reference temperature data is established prior to generating an absolute temperature for a point of interest by:
    (a) identifying a reference point on said surface;
    (b) adjusting said pyrometer such that said portion of said emitted image that is directed to said video imager means and results in said reference point surface image data is input to said pyrometer; and
    (c) fixing the position of said pyrometer within said camera.

4. A system as claimed in claim 1, wherein said video imager means is an infrared vidicon tube.

5. A system as claimed in claim 1, wherein said video imager means is a solid state detector.

6. A system as claimed in claim 1, wherein said analysis means determines said point of interest absolute temperature value T by:

$$T = \frac{\theta}{\frac{\theta}{T_R} - \gamma \ln\left[\frac{(V_M - V_B)}{(V_R - V_B)}\right]},$$

where $V_B$ is a black level signal input, $T_R$ is said reference temperature value, $V_R$ is said reference data, $V_M$ is said point of interest surface image data, $\theta$ is $14384\mu°$ K./$\lambda$, and $\gamma$ is a power coefficient.

7. A system as claimed in claim 1, wherein said camera means includes multiplexing means for combining said surface image data and said reference temperature data to produce a single set of image signals and said communication means includes demultiplexing means for separating said image signals into said surface image data and said reference temperature data.

8. A system as claimed in claim 1, wherein said temperature-analyzing means further includes operator interface means, in communication with said temperature-analyzing means, for displaying said surface image data and said temperature values.

9. A system as claimed in claim 8, wherein said temperature-analyzing means further includes means for digitizing said surface image data and said temperature values, whereby said digitized surface image data and temperature values are displayed by said display means.

10. A system as claimed in claim 9, wherein said display means includes means for converting said surface intensity image into a colored image such that said image colors correspond to the absolute temperatures in said surface image data.

11. A system as claimed in claim 1, wherein said system further includes operator interface means, in communication with said temperature-analyzing means, for receiving an operator command identifying the point of interest on the surface, wherein said communication means receives said command, and wherein said region identifying means identifies said point of interest surface image data in response to said command.

12. A system as claimed in claim 1, wherein said surface image data is representative of video intensity, and wherein:
    (a) said temperature-analyzing means further includes averaging means for averaging the video intensity of said point of interest surface image data to produce a point of interest video average and for averaging said reference point surface image data to produce a reference video average;
    (b) said region identifying means identifying a region of surface image data related to said point of interest and a region of surface image data related to said reference point; and
    (c) said analysis means combines said reference temperature data, said reference video average and said point of interest video average to generate said absolute temperature value.

13. A method for generating an absolute temperature value for a point of interest on a surface, including the steps of:
    (a) gathering surface image data and reference temperature data by:
        (i) gathering an emitted image of the surface;
        (ii) generating a surface intensity image from said emitted image; and
        (iii) generating reference temperature data from said emitted image for a predetermined reference point on the surface, wherein the positional relationship between said reference point and said surface image data is fixed; and
    (b) determining the absolute temperature at the point of interest by:
        (i) identifying surface image data related to said point of interest and identifying surface image data related to said reference point; and
        (ii) generating an absolute temperature value related to the point of interest by combining said reference temperature data, said reference surface image data, and said point of interest surface image data, such that said combination is said absolute temperature value.

14. A method as claimed in claim 13, further including the step of establishing said positional relationship between said reference point and said reference temperature data by:
    (a) identifying a reference point on said surface;
    (b) identifying a portion of said emitted image that corresponds to said reference point on said surface; and
    (c) utilizing said identified portion of said emitted image to generate said reference temperature data.

15. A camera for gathering surface image data and reference temperature data in a temperature-imaging system for generating absolute temperature values for points of interest on a surface, the surface image data including reference point image data, the camera including:
    (a) image-gathering means for gathering an emitted image of the surface;
    (b) beam splitting means for creating two optical paths over which said emitted image passes;
    (c) video imager means positioned in a first optical path for generating surface image data from said emitted image; and
    (d) temperature-generating means positioned in a second optical path for generating reference temperature data from said emitted image for a predetermined reference point on the surface, wherein the positional relationship between said reference point and the surface image data is fixed, whereby said reference point image data and said reference temperature data is used to calibrate the absolute temperature analysis of the temperature imaging system.

16. A camera as claimed in claim 15, wherein said positional relationship between the reference point and said reference temperature data is established by:
(a) identifying a reference point on the surface;
(b) adjusting said temperature-generating means such that said temperature-generating means receives the portion of said emitted image that is passed along said first optical path and results in said reference point surface image data; and
(c) fixing the position of said temperature-generating means within said camera.

17. A camera as claimed in claim 15, wherein said video imager means is an infrared vidicon tube.

18. A camera as claimed in claim 15, wherein said video imager means is a solid state detector.

19. A camera as claimed in claim 15, wherein said temperature-generating means is a pyrometer.

* * * * *